US012666189B2

(12) United States Patent
Chen et al.

(10) Patent No.: US 12,666,189 B2
(45) Date of Patent: Jun. 23, 2026

(54) DEVICE AND METHOD FOR DETECTING A WEARING STATUS OF A HEADPHONE

(71) Applicant: Lanto Electronic Limited, Kunshan City (CN)

(72) Inventors: Hsin-Nan Chen, Kunshan City (TW); Tsung-Pao Hsu, Kunshan City (TW); Jung-Pin Chien, Kunshan City (TW); Yao-Chun Tsai, Kunshan City (TW); Che-Yung Huang, Kunshan City (TW)

(73) Assignee: LANTO ELECTRONIC LIMITED, Kunshan City (CN)

( * ) Notice: Subject to any disclaimer, the term of this patent is extended or adjusted under 35 U.S.C. 154(b) by 210 days.

(21) Appl. No.: 18/625,890

(22) Filed: Apr. 3, 2024

(65) Prior Publication Data

US 2025/0088785 A1 Mar. 13, 2025

(30) Foreign Application Priority Data

Sep. 7, 2023 (CN) .......................... 202311152566.1

(51) Int. Cl.
*H04R 1/10* (2026.01)
*G01D 5/14* (2006.01)
(Continued)

(52) U.S. Cl.
CPC ............. *H04R 1/1041* (2013.01); *G01D 5/14* (2013.01); *G01S 17/08* (2013.01);
(Continued)

(58) Field of Classification Search
CPC ................ H04R 1/1041; H04R 29/001; H04R 2201/10; H04R 1/1008; H04R 5/033;
(Continued)

(56) References Cited

U.S. PATENT DOCUMENTS

| | | | | |
|---|---|---|---|---|
| 11,317,192 | B2 * | 4/2022 | Tong | H04R 5/033 |
| 2006/0045304 | A1 * | 3/2006 | Lee | H04R 1/1041 |
| | | | | 381/384 |

(Continued)

FOREIGN PATENT DOCUMENTS

| | | |
|---|---|---|
| CN | 109792579 B | 8/2021 |
| CN | 113766411 A | 12/2021 |

(Continued)

OTHER PUBLICATIONS

Taiwanese Office Action and Search Report for Taiwanese Application No. 113113031, dated May 16, 2025, with English translation.

*Primary Examiner* — Oyesola C Ojo
(74) *Attorney, Agent, or Firm* — Birch, Stewart, Kolasch & Birch, LLP

(57) ABSTRACT

A device for detecting a wearing status of a headphone includes a sensor, a player, an acoustic detection assembly and a microprocessor, where the acoustic detection assembly is connected to the player through a digital-to-analog converter, and the microprocessor is connected to the sensor and the acoustic detection assembly separately; the sensor is configured to determine, in combination with the microprocessor, a wearing status of the headphone within a period of time after current time in the case where the headphone is in a worn status at the current time; and the acoustic detection assembly is configured to determine, in combination with the microprocessor and the player, the wearing status of the headphone within the period of time after the current time in the case where the headphone is in a non-worn status at the current time.

17 Claims, 7 Drawing Sheets

(51) Int. Cl.
  G01S 17/08        (2006.01)
  G06F 11/30        (2006.01)
  G06F 11/32        (2006.01)
  H04R 29/00        (2006.01)
(52) U.S. Cl.
  CPC .......... G06F 11/3013 (2013.01); G06F 11/32 (2013.01); H04R 29/001 (2013.01)
(58) Field of Classification Search
  CPC ....... G01D 5/14; G01S 17/08; G06F 11/3013; G06F 11/32; G06F 11/3041; G06F 11/3055
  See application file for complete search history.

(56)                References Cited

U.S. PATENT DOCUMENTS

| 2010/0020982 | A1* | 1/2010 | Brown | ................. | H04R 1/1041 381/74 |
|---|---|---|---|---|---|
| 2010/0020998 | A1* | 1/2010 | Brown | ................. | H04R 1/1041 381/375 |

| 2012/0114154 | A1* | 5/2012 | Abrahamsson | ........ | H04R 5/033 381/309 |
|---|---|---|---|---|---|
| 2013/0279724 | A1* | 10/2013 | Stafford | ............... | H04R 1/1041 381/74 |
| 2014/0321682 | A1* | 10/2014 | Kofod-Hansen | ...... | H04R 25/30 381/315 |
| 2017/0142522 | A1* | 5/2017 | Hayashi | .......... | G10K 11/17875 |
| 2017/0230743 | A1* | 8/2017 | Lee | ...................... | H04R 1/1041 |
| 2019/0387304 | A1* | 12/2019 | Song | ....................... | G06F 3/165 |
| 2022/0295183 | A1* | 9/2022 | Chen | ................... | H04R 1/1091 |

FOREIGN PATENT DOCUMENTS

| CN | 114157975 | A | 3/2022 |
|---|---|---|---|
| CN | 115039415 | A | 9/2022 |
| CN | 115866473 | A | 3/2023 |
| TW | 201114269 | A1 | 4/2011 |
| TW | 201729611 | A | 8/2017 |
| TW | 202137784 | A | 10/2021 |
| TW | 202325046 | A | 6/2023 |

* cited by examiner

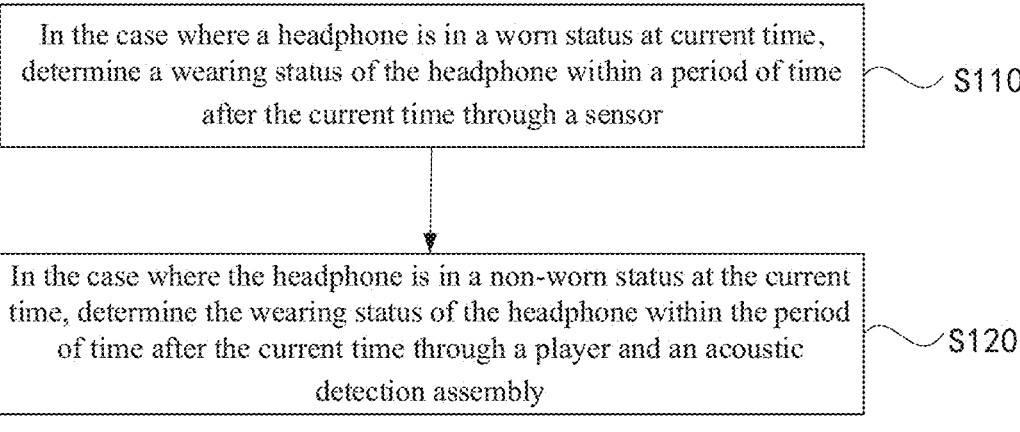

In the case where a headphone is in a worn status at current time, determine a wearing status of the headphone within a period of time after the current time through a sensor — S110

In the case where the headphone is in a non-worn status at the current time, determine the wearing status of the headphone within the period of time after the current time through a player and an acoustic detection assembly — S120

FIG. 8

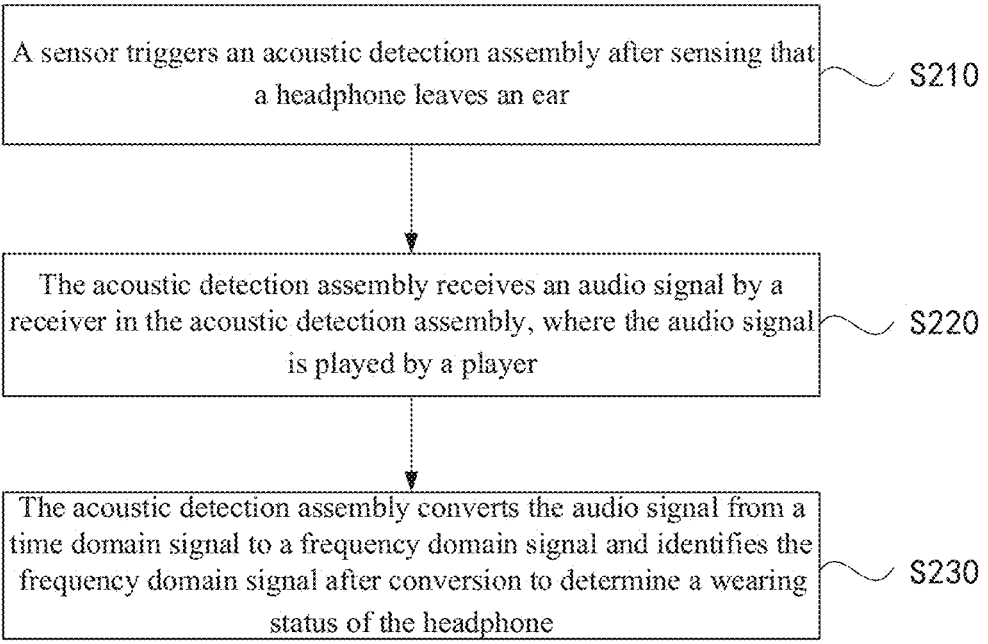

A sensor triggers an acoustic detection assembly after sensing that a headphone leaves an ear — S210

The acoustic detection assembly receives an audio signal by a receiver in the acoustic detection assembly, where the audio signal is played by a player — S220

The acoustic detection assembly converts the audio signal from a time domain signal to a frequency domain signal and identifies the frequency domain signal after conversion to determine a wearing status of the headphone — S230

DEVICE AND METHOD FOR DETECTING A WEARING STATUS OF A HEADPHONE

CROSS-REFERENCE TO RELATED APPLICATION

This application claims priority to Chinese Patent Application No. 202311152566.1 filed Sep. 7, 2023, the disclosure of which is incorporated herein by reference in its entirety.

TECHNICAL FIELD

The present disclosure relates to the technical field of headphones and, for example, to a device and method for detecting a wearing status of a headphone.

BACKGROUND

The noise of headphone products may be divided into two types. One type is electrical noise caused by an internal circuit or an external signal, and manufacturers can effectively suppress and cancel the electrical noise through a circuit design. The other type of noise is the so-called ambient noise, which affects the comfort of a user using a headphone. To reduce the ambient noise, active noise cancellation is generally used. A conventional digital active noise cancellation system samples ambient noise through a detection microphone, generates a signal for canceling the ambient noise through signal processing, and emits an audio signal whose phases are opposite to the phases of the noise through a speaker, thereby counteracting the ambient noise outside.

Generally, the active noise cancellation system continuously monitors sounds reaching ears through the detection microphone in a housing of the headphone. An output signal of the detection microphone is amplified, digitized by an analog-to-digital converter, and then sent to a digital noise reduction processor. A signal from a music source is digitized by an analog-to-digital converter and processed by a digital equalization processor to obtain appropriate characteristics. Then, the signal enters the digital noise reduction processor, and the digital noise reduction processor subtracts the ambient noise from the signal from the music source and extracts noise to be cancelled. The extracted noise to be cancelled undergoes phase inversion, and the processed signal result is played back together with the music signal through a driver so that the noise is cancelled before entering the ears.

Generally, the headphone with an active noise cancellation function system needs to operate relying on a battery or another power supply. In this case, a common problem is the continuous consumption of power when the user takes off the headphone without turning off the headphone. Moreover, before wearing the headphone, the user desires that the active noise cancellation function system be notified in advance to prepare for startup.

SUMMARY

The present disclosure provides a device and method for detecting a wearing status of a headphone, so as to solve the problem in the related art of a failure to effectively detect the wearing status of the headphone.

According to an aspect of the present disclosure, a device for detecting a wearing status of a headphone is provided. The device includes a sensor, a player, an acoustic detection assembly and a microprocessor, where the acoustic detection assembly and a microprocessor, where the acoustic detection assembly is connected to the player through a digital-to-analog converter, and the microprocessor is connected to the sensor and the acoustic detection assembly separately.

The sensor is configured to determine, in combination with the microprocessor, a wearing status of the headphone within a period of time after current time in the case where the headphone is in a worn status at the current time.

The acoustic detection assembly is configured to determine, in combination with the microprocessor and the player, the wearing status of the headphone within the period of time after the current time in the case where the headphone is in a non-worn status at the current time.

According to another aspect of the present disclosure, a device for detecting a wearing status of a headphone is provided. The device includes a sensor, a player, an acoustic detection assembly and a microprocessor, where the acoustic detection assembly is connected to the player through a digital-to-analog converter, and the microprocessor is connected to the sensor and the acoustic detection assembly separately.

The sensor is configured to send a trigger signal to the microprocessor after sensing that the headphone leaves an ear.

The microprocessor is configured to switch to the acoustic detection assembly after receiving the trigger signal.

The acoustic detection assembly is configured to receive an audio signal received by a receiver in the acoustic detection assembly and played by the player, convert the audio signal from a time domain signal to a frequency domain signal, and identify the frequency domain signal after conversion to determine the wearing status of the headphone.

According to another aspect of the present disclosure, a method for detecting a wearing status of a headphone is provided. The method includes the steps below.

In the case where the headphone is in a worn status at current time, a wearing status of the headphone within a period of time after the current time is determined through a sensor.

In the case where the headphone is in a non-worn status at the current time, the wearing status of the headphone within the period of time after the current time is determined through a player and an acoustic detection assembly.

According to another aspect of the present disclosure, a method for detecting a wearing status of a headphone is provided. The method includes the steps below.

A sensor triggers an acoustic detection assembly after sensing that the headphone leaves an ear.

The acoustic detection assembly receives an audio signal received by a receiver and played by a player.

The acoustic detection assembly converts the audio signal from a time domain signal to a frequency domain signal and identifies the frequency domain signal after conversion to determine the wearing status of the headphone.

According to another aspect of the present disclosure, a headphone is provided, where the foam of an ear cup of the headphone matches a sensor in shape. The headphone includes the device for detecting a wearing status of a headphone according to any embodiment of the present disclosure.

BRIEF DESCRIPTION OF DRAWINGS

To illustrate technical solutions in embodiments of the present disclosure more clearly, the drawings to be used in the description of the embodiments are described below briefly. Apparently, the drawings described below illustrate part of the embodiments of the present disclosure, and those of ordinary skill in the art may obtain other drawings based on these drawings on the premise that no creative work is done.

FIG. 8 is a flowchart of a method for detecting a wearing status of a headphone according to embodiment six of the present disclosure.

FIG. 9 is a flowchart of a method for detecting a wearing status of a headphone according to embodiment seven of the present disclosure.

DETAILED DESCRIPTION

For a better understanding of solutions of the present disclosure by those skilled in the art, the solutions in embodiments of the present disclosure are described below clearly and completely in conjunction with the drawings in the embodiments of the present disclosure. Apparently, the embodiments described below are part, not all, of the embodiments of the present disclosure. Based on the embodiments described herein, all other embodiments obtained by those of ordinary skill in the art on the premise that no creative work is done are within the scope of the present disclosure. It is to be understood that steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one other embodiment". The term "some embodiments" refers to "at least some embodiments". Definitions of other terms are given in the description hereinafter.

It is to be noted that terms such as "first" and "second" in the description, claims and above drawings of the present disclosure are used to distinguish between similar objects and are not necessarily used to describe a particular order or sequence. It is to be understood that data used in this manner are interchangeable where appropriate so that the embodiments of the present disclosure described herein can be implemented in a sequence not illustrated or described herein. Additionally, terms "including" and "having" and any other variations thereof are intended to encompass a non-exclusive inclusion. For example, a process, method, system, product or apparatus that includes a series of steps or units not only includes the expressly listed steps or units but may also include other steps or units that are not expressly listed or are inherent to such process, method, product or apparatus.

It is to be noted that "one" and "multiple" mentioned in the present disclosure are not limiting but illustrative. It is to be understood by those skilled in the art that "one" and "multiple" are construed as "one or more" unless otherwise specified in the context.

The names of messages or information exchanged between multiple devices in the embodiments of the present disclosure are used for illustrative purposes and are not intended to limit the scope of such messages or information.

Embodiment One

Figure 1:
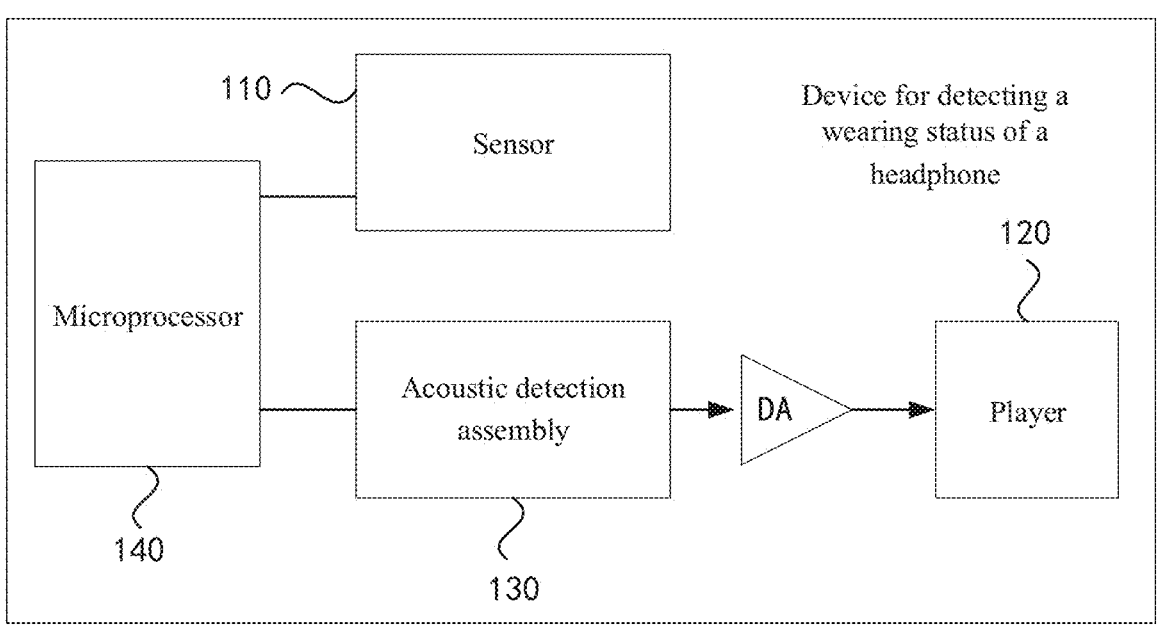
FIG. 1 is a structure diagram of a device for detecting a wearing status of a headphone according to embodiment one of the present disclosure.

FIG. 1 is a structure diagram of a device for detecting a wearing status of a headphone according to embodiment one of the present disclosure. The device for detecting a wearing status of a headphone is applicable to the detection of whether the headphone is put into an ear. The device for detecting a wearing status of a headphone may be implemented by software and hardware and may include a sensor and an acoustic detection assembly to detect, through different assemblies, whether the headphone is put into the ear.

As shown in FIG. 1, the device for detecting a wearing status of a headphone according to embodiment one of the present disclosure includes a sensor 110, a player 120, an acoustic detection assembly 130 and a microprocessor 140, where the acoustic detection assembly 130 is connected to the player 120 through a digital-to-analog converter, and the microprocessor 140 is connected to the sensor 110 and the acoustic detection assembly 130 separately.

The sensor 110 is configured to determine, in combination with the microprocessor 140, a wearing status of the headphone within a period of time after current time in the case where the headphone is in a worn status at the current time.

The acoustic detection assembly 130 is configured to determine, in combination with the microprocessor 140 and the player 120, the wearing status of the headphone within the period of time after the current time in the case where the headphone is in a non-worn status at the current time.

It is to be noted that since the sensor 110 cannot distinguish whether an object is a human ear or a metal object, the wearing status of the headphone may be detected by the sensor 110 when it is determined that the headphone is in the worn status. In this case, the distance between an ear of a user and the headphone is detected so that mis-determination caused by the placement of the headphone on the metal object can be effectively avoided.

In this embodiment, the sensor 110 may be different types of sensor. In some embodiments, the sensor 110 may include an optical sensor, a pressure sensor, a biosensor and a magnetic sensor.

The optical sensor may send a time difference of light reflection to the microprocessor 140 according to the principle of light reflection so that the microprocessor 140 determines the wearing status of the headphone within the period of time after the current time. The pressure sensor may measure a pressure value of an ear cup according to the principle of mechanics so that the microprocessor 140 determines the wearing status of the headphone within the period of time after the current time according to the pressure value. The magnetic sensor may measure a magnetic field intensity of a magnet in the player 120 according to the principle of magnetic induction so that the microprocessor 140 determines the wearing status of the headphone within the period of time after the current time according to the magnetic field intensity.

The microprocessor 140 may be a computing chip small in volume, and the microprocessor 140 may calculate the wearing status of the headphone within the period of time after the current time according to a measurement result fed back by the sensor 110.

In this embodiment, the acoustic detection assembly 130 may be an assembly including software and hardware, and the acoustic detection assembly 130 is disposed between the player 120 and the microprocessor 140. When it is detected that the headphone is not worn on the ear of the user or the headphone has been in the non-worn status for a long time, the wearing status of the headphone in the later period may be detected by the acoustic detection assembly 130.

In combination with the microprocessor 140 and the player 120, the acoustic detection assembly 130 may detect the distance between the headphone and the object according to the acoustic principle and determine the wearing status of the headphone. Additionally, the acoustic detection assembly 130 may effectively determine whether the headphone is worn on a person.

In this embodiment, the player 120 may be any assembly with an audio playing function. For example, the player 120 may be a speaker. The player 120 may be configured to receive an audio signal converted by the acoustic detection assembly 130 through the digital-to-analog converter to emit a sound.

The device for detecting a wearing status of a headphone according to embodiment one of the present disclosure includes the sensor 110, the player 120, the acoustic detection assembly 130 and the microprocessor 140, the acoustic detection assembly 130 is connected to the player 120 through the digital-to-analog converter, and the microprocessor 140 is connected to the sensor 110 and the acoustic detection assembly 130 separately; the sensor 110 is configured to determine, in combination with the microprocessor 140, the wearing status of the headphone within the period of time after the current time in the case where the headphone is in the worn status at the current time; and the acoustic detection assembly 130 is configured to determine, in combination with the microprocessor 140 and the player 120, the wearing status of the headphone within the period of time after the current time in the case where the headphone is in the non-worn status at the current time. The device can effectively detect the wearing status of the headphone through the acoustic detection assembly and the sensor.

Embodiment Two

Figure 2:
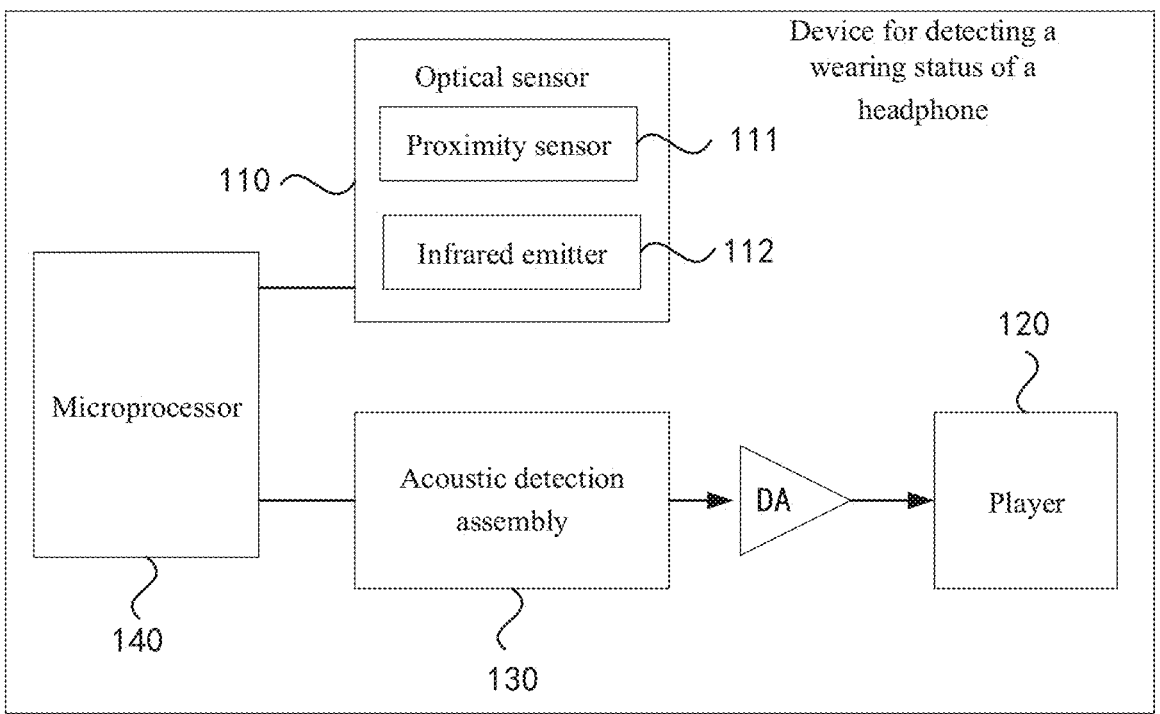
FIG. 2 is a structure diagram of a device for detecting a wearing status of a headphone according to embodiment two of the present disclosure.

FIG. 2 is a structure diagram of a device for detecting a wearing status of a headphone according to embodiment two of the present disclosure. Embodiment two provides an optimization based on embodiment one. For details of this embodiment, reference may be made to embodiment one, and the details are not repeated here.

In this embodiment, the sensor 110 is an optical sensor 110 including a proximity sensor 111 and an infrared emitter 112.

The infrared emitter 112 is configured to emit infrared light.

The proximity sensor 111 is configured to receive reflected infrared light generated when the infrared light is reflected by an object and send the time when the reflected infrared light is received to the microprocessor 140. The microprocessor 140 calculates the distance between the object and the headphone according to the time and determines the wearing status of the headphone within a period of time after the current time according to the distance. The optical sensor 110 may be an optical ranging sensor. When it is detected that the headphone is worn on the ear of the user, that is, the headphone is in the worn status, the wearing status of the headphone in the later period may be detected by the optical sensor 110.

The optical sensor 110 may measure a time for the infrared light to be reflected back so that the microprocessor 140 calculates the distance between the ear of the user and the headphone according to the time and determines the wearing status of the headphone. In some embodiments, if the distance between the ear of the user and the headphone is greater than a preset value, it may be determined that the headphone leaves the ear and the headphone is not in the worn status; and if the distance between the ear of the user and the headphone is less than or equal to the preset value, it may be determined that the headphone is still worn on the ear of the user and the headphone is in the worn status. The preset value may be set according to actual situations and is not specifically limited here.

The proximity sensor 111 is a general term for sensors that are designed to detect objects without being in contact with the objects and that replace a contact detection manner such as a limit switch. The proximity sensor 111 can detect motion information and presence information of the object and convert the information into an electrical signal.

The working principle of the optical sensor 110 is as follows: the infrared emitter 112 emits the infrared light, the infrared light is reflected back to the proximity sensor 111 after irradiated to the surface of the object, and since the speed of light is known, the proximity sensor 111 may measure the time for the infrared light to be reflected back so that the microprocessor 140 may calculate a product of the speed of light and the time to obtain the distance between the object and the headphone. The object may be understood as the human ear, that is, the optical sensor 110 measures the distance between the human ear and the headphone.

The device for detecting a wearing status of a headphone according to embodiment two of the present disclosure includes the optical sensor 110, the player 120, the acoustic detection assembly 130 and the microprocessor 140, the acoustic detection assembly 130 is connected to the player 120 through the digital-to-analog converter, and the microprocessor 140 is connected to the optical sensor 110 and the acoustic detection assembly 130 separately; the optical sensor 110 is configured to determine, in combination with the microprocessor 140, the wearing status of the headphone within the period of time after the current time in the case where the headphone is in the worn status at the current time; and the acoustic detection assembly 130 is configured to determine, in combination with the microprocessor 140 and the player 120, the wearing status of the headphone within the period of time after the current time in the case where the headphone is in the non-worn status at the current time. The device can effectively detect the wearing status of the headphone through the acoustic detection assembly and the sensor.

Embodiment Three

Figure 3:
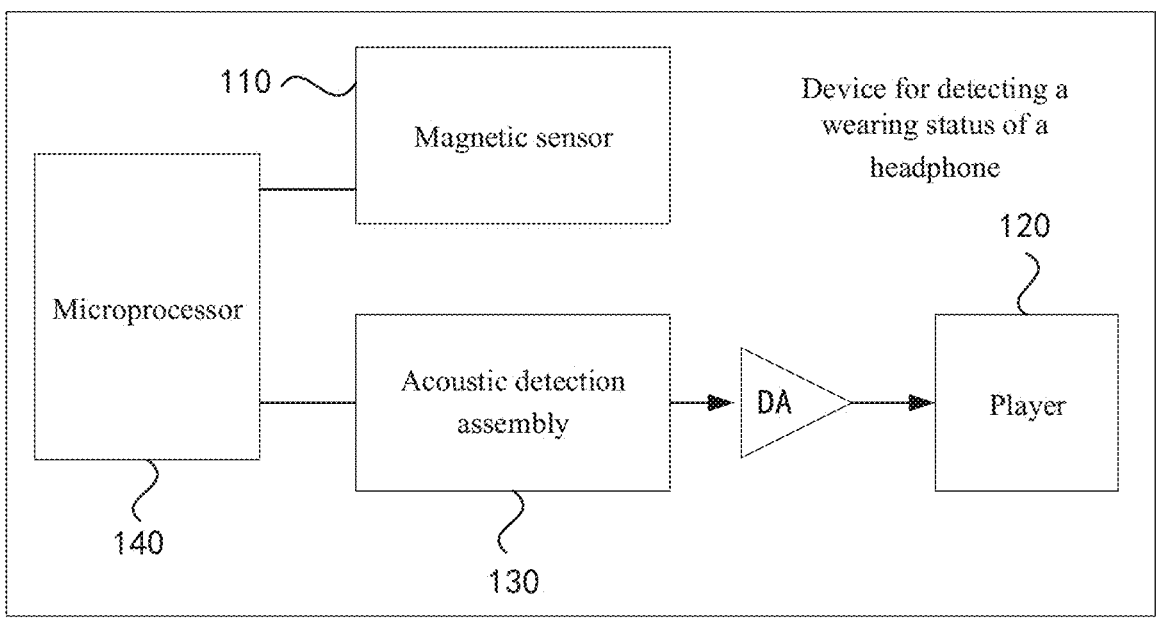
FIG. 3 is a structure diagram of a device for detecting a wearing status of a headphone according to embodiment three of the present disclosure.

FIG. 3 is a structure diagram of a device for detecting a wearing status of a headphone according to embodiment three of the present disclosure. Embodiment three provides an optimization based on embodiment one. For details of this embodiment, reference may be made to embodiment one, and the details are not repeated here.

In this embodiment, the sensor 110 is a magnetic sensor 110 configured to, when the magnet in the player 120 moves, measure the magnetic field intensity of the magnet and send the magnetic field intensity to the microprocessor 140 so that the microprocessor 140 calculates a relative motion status between an object and the headphone according to the magnetic field intensity and determines the wearing status of the headphone within the period of time after the current time according to the relative motion status.

The magnet is provided in the player 120. When the headphone leaves the human ear, the magnet in the player 120 moves so that the magnetic sensor 110 may measure a change of the intensity of the magnet in the player 120, and then the microprocessor 140 may calculate the relative motion status between the object and the headphone according to the magnetic field intensity of the magnet in the player 120 and determine the wearing status of the headphone within the period of time after the current time according to the relative motion status. In some embodiments, if the magnetic field intensity of the magnet becomes smaller, it indicates that the headphone moves away from the object, and it is determined that the headphone is in the non-worn status within the period of time after the current time. If the magnetic field intensity of the magnet becomes larger, it indicates that the headphone approaches the object, and it is determined that the headphone is in the worn status within the period of time after the current time.

The device for detecting a wearing status of a headphone according to embodiment three of the present disclosure includes the magnetic sensor 110, the player 120, the acoustic detection assembly 130 and the microprocessor 140, the acoustic detection assembly 130 is connected to the player 120 through the digital-to-analog converter, and the microprocessor 140 is connected to the magnetic sensor 110 and the acoustic detection assembly 130 separately; the magnetic sensor 110 is configured to determine, in combination with the microprocessor 140, the wearing status of the headphone within the period of time after the current time in the case where the headphone is in the worn status at the current time; and the acoustic detection assembly 130 is configured to determine, in combination with the microprocessor 140 and the player 120, the wearing status of the headphone within the period of time after the current time in the case where the headphone is in the non-worn status at the current time. The device can effectively detect the wearing status of the headphone through the acoustic detection assembly and the sensor.

Embodiment Four

Figure 4:
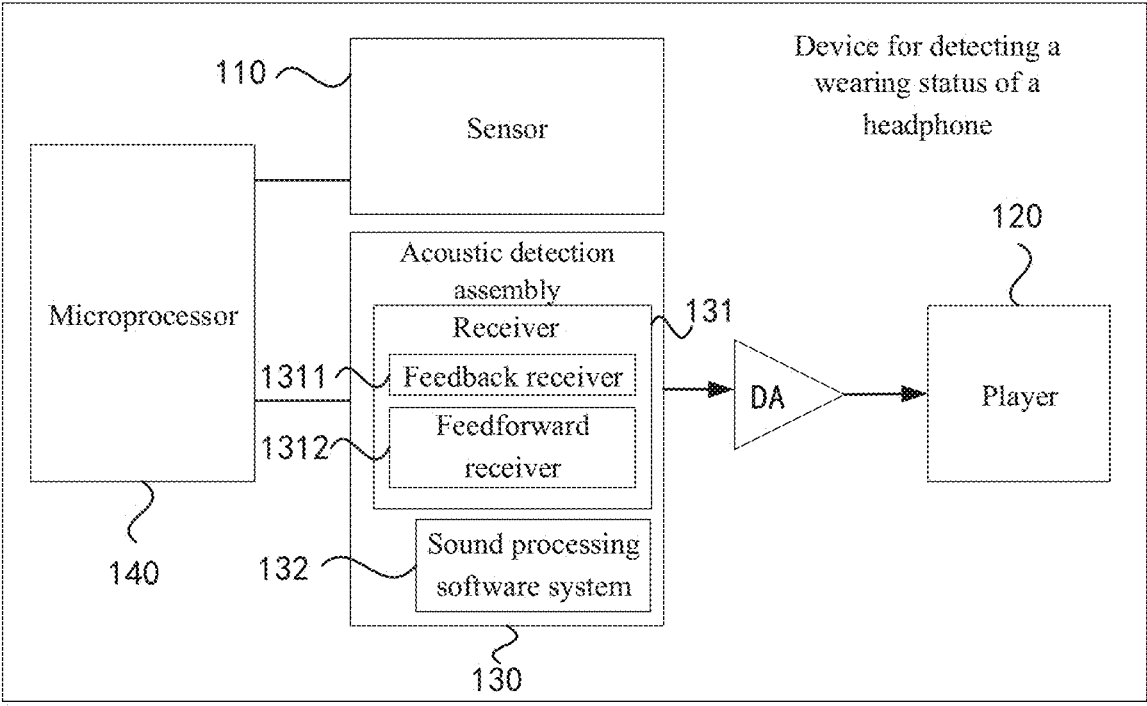
FIG. 4 is a structure diagram of a device for detecting a wearing status of a headphone according to embodiment four of the present disclosure.

FIG. 4 is a structure diagram of a device for detecting a wearing status of a headphone according to embodiment four of the present disclosure. Embodiment four provides an optimization based on preceding embodiments. For details of this embodiment, reference may be made to embodiments one to three, and the details are not repeated here.

In this embodiment, the acoustic detection assembly 130 includes a receiver 131, where the receiver 131 may be any assembly having an audio acquisition function. For example, the receiver 131 may be a microphone. The receiver 131 may include two types of receiver which are disposed directly in the front and the rear of the player 120 separately. The receiver 131 may be configured to receive an audio signal outside the headphone, where the audio signal may include ambient noise and a reflected audio.

In this embodiment, the acoustic detection assembly 130 is configured to send a test audio to the player 120 so that the player 120 plays a sound wave to the outside, where the receiver 131 is configured to receive a reflected audio returned when the sound wave is reflected by an object, and send the reflected audio to the microprocessor 140 so that the microprocessor 140 determines whether the headphone is worn on the person according to an amplitude change of the reflected audio.

Any segment of audio may be played as the test audio.

It is to be noted that the amplitude of the reflected sound wave when the sound wave is reflected by the human ear is 20 Hz to 2 kHz, and the amplitude of the reflected sound wave when the sound wave is reflected by a metal plane does not have tremendous changes; therefore, whether the headphone is placed on the surface of the metal object or worn on the person can be determined according to the amplitude change of the received reflected sound wave.

Further, the acoustic detection assembly 130 also includes a sound processing software system 132.

The microprocessor 140 is further configured to edit different audio signals into time codes and send the time codes to the sound processing software system 132.

The sound processing software system 132 is configured to process the time codes and send the processed time codes to the player 120 through the digital-to-analog converter so that the player 120 plays the different audio signals, where reflected audio signals of the played different audio signals reflected from an object are received by the receiver 131.

The sound processing software system 132 is further configured to receive the reflected audio signals sent by the receiver 131 through an analog-to-digital converter, perform frequency sampling on the reflected audio signals, acquire the corresponding time codes, and send sending time points and receiving time points of the corresponding time codes to the microprocessor 140.

The microprocessor 140 is further configured to calculate time differences according to the sending time points and the receiving time points and determine the wearing status of the headphone according to the time differences.

The microprocessor 140 is mainly configured to edit the different audio signals into the time codes and send the time codes to the sound processing software system 132, the sound processing software system 132 processes the time codes and forwards the time codes to the player 120 through the digital-to-analog converter, and the player 120 emits the different audio signals; the audio signals collide with the object to be reflected and then received by the receiver 131, the receiver 131 digitizes the received reflected audio signals through the analog-to-digital converter and sends the digitized reflected audio signals to the sound processing software system 132, and the sound processing software system 132 performs the frequency sampling, determines the corresponding time codes according to the sampled frequencies, and sends the sending time points and the receiving time points of the corresponding time codes to the micro-processor 140 so that the microprocessor 140 may calculate the time differences between sending and receiving of the audio signals according to the time points and calculate a relative position between the object and the headphone according to the time differences.

Further, an audio signal corresponds to a time code, where the time code includes a first time code and a second time code. A preset number of first time codes are used as a first group of time codes, a preset number of second time codes are used as a second group of time codes, the first group of time codes and the second group of time codes are sent at intervals, and in each group of time codes, audio signals corresponding to the time codes are sent in an arrangement order of multiple time codes.

It is to be understood that the first group of time codes and the second group of time codes are used for distinguishing between two groups of time codes; and the first time code and the second time code are used for distinguishing between time codes in different groups, a time code belong-ing to the first group of time codes is referred to as the first time code, and a time code belonging to the second group of time codes is referred to as the second time code. It is to be noted that two groups of time codes are set, so as to distinguish audio signals sent in adjacent time periods and not to confuse the audio signals.

For example, a 5 kHz audio signal corresponds to a first time code A and a second time code G; a 10 kHz audio signal corresponds to a first time code B and a second time code H; a 15 kHz audio signal corresponds to a first time code C and a second time code I; a 25 kHz audio signal corresponds to a first time code D and a second time code J; a 35 kHz audio signal corresponds to a first time code E and a second time code K; and a 45 kHz audio signal corresponds to a first time code F and a second time code L.

In this embodiment, the sound processing software sys-tem 132 sends the time codes to the player 120 in sequence at a first predetermined interval. For example, after the time code A is sent, the time code B is sent after the first predetermined interval and then the code C is sent after another first predetermined interval until the code F is sent. The first predetermined interval may be 1 s, that is, the sending of the time codes A to F requires 6 s in total. The player 120 may add the corresponding audio signals to audio signals of the headphone according to the received time codes to play multiple audio signals corresponding to the time codes. After a second predetermined interval, the sound processing software system 132 sends the time codes to the player 120 in sequence at the first predetermined interval in a playback order of G, H, I, J, K and L. The second predetermined interval is 1 s, that is, it takes 12 s in total to play the audio signals corresponding to the time codes A to F and the time codes G to L. The sound processing software system 132 repeats the preceding process until a preset time is reached, and the audio signals corresponding to all the time codes are sent to the player 120. The preset time may be 60 s.

Further, the audio signals include first audio signals, the receiver 131 includes a feedback receiver 1311, and corre-spondingly, the microprocessor 140 is configured to deter-mine, according to multiple first time points at which the first audio signals reflected for the first time are received by the feedback receiver 1311 and multiple second time points at which the first audio signals are played by the player 120, multiple first time differences of the first audio signals and determine the wearing status of the headphone according to changes of the multiple first time differences.

In this embodiment, the microprocessor 140 detects the reflected audio signals from sound signals sampled from the environment by the feedback receiver 1311 and obtains the multiple first time points at which the reflected audio signals corresponding to the time codes A to F are received by the feedback receiver 1311; after sending the time codes for 60 s, the microprocessor 140 stores the multiple second time points at which the time codes are sent and subtracts the second time points corresponding to the same codes from the first time points to obtain the multiple first time differ-ences; and the microprocessor 140 may determine the wear-ing status of the headphone according to the changes of the first time differences.

In some embodiments, the microprocessor 140 may deter-mine whether the multiple first time differences are all greater than a preset first time. If so, it indicates that the headphone is maintained at a fixed distance or farther away from the object. Therefore, the microprocessor 140 deter-mines that the headphone is in the non-worn status. For example, the first time may be 90 us.

In some embodiments, when the microprocessor 140 determines that if one of the multiple first time differences is less than the preset first time, it indicates that the distance between the headphone and the object is constantly chang-ing. Thus, a change situation of the distance between the headphone and the object needs to be further determined. In correspondence with the playback order, the multiple first time differences include an initial first time difference and the last first time difference in an order; if the last first time difference is greater than the initial first time difference, it indicates that the headphone is moving away from the object. The order of the last first time difference is after the order of the initial first time difference. Therefore, the microprocessor 140 may determine that the wearing status of the headphone is leaving the ear. Conversely, if the initial first time difference and the last first time difference, which satisfy that the last first time difference is greater than the initial first time difference, are absent, it indicates that the headphone is not moving away from the object. Therefore, the microprocessor 140 may determine that the wearing status of the headphone is being worn.

In some embodiments, after the microprocessor 140 determines that not all of the multiple first time differences are greater than the preset first time, the microprocessor 140 may further determine the change situation of the distance between the headphone and the object. If the multiple first time differences include the initial first time difference and the last first time difference in correspondence with the playback order, which satisfy that the last first time differ-ence is smaller than the initial first time difference, it indicates that the headphone is approaching the object. Therefore, the microprocessor 140 determines that the wear-ing status of the headphone is being worn. Conversely, if the initial first time difference and the last first time difference, which satisfy that the last first time difference is smaller than the initial first time difference, are absent, it indicates that the headphone is moving away from the object. Therefore, the microprocessor 140 determines that the wearing status of the headphone is leaving the ear.

Further, the audio signals include second audio signals, the receiver 131 includes a feedforward receiver 1312, and correspondingly, the microprocessor 140 is configured to determine, according to multiple third time points at which the second audio signals reflected for the first time are received by the feedforward receiver 1312 and multiple fourth time points at which the second audio signals are played by the player 120, multiple second time differences of the second audio signals and determine, according to whether the multiple second time differences are all smaller than a preset time, whether the headphone is in a handheld status.

In this embodiment, the microprocessor 140 sends the time codes to the player 120 at the first predetermined interval in the playback order of A to F; the player 120 adds the corresponding audio signals to the audio signals of the headphone according to the received time codes to play multiple second audio signals corresponding to the time codes; after the second predetermined interval, the microprocessor 140 sends the time codes to the player 120 at the first predetermined interval in the playback order of G to L; and the microprocessor 140 repeats the preceding process until the audio signals corresponding to all the time codes are sent to the player 120.

The feedforward receiver 1312 sends sampled sound signals to the sound processing software system 132, the sound processing software system 132 detects the reflected audio signals from the sound signals sampled from the environment by the feedforward receiver 1312 and obtains the multiple third time points at which the multiple second audio signals reflected for the first time are received by the feedforward receiver 1312, and the sound processing software system 132 sends the multiple third time points to the microprocessor 140 so that the microprocessor 140 may determine, according to the multiple third time points, whether the headphone is in the handheld status.

In some embodiments, after sending the time codes for 60 s, the microprocessor 140 stores the multiple fourth time points at which the time codes are sent and subtracts the fourth time points corresponding to the same codes from the third time points to obtain the multiple second time differences. If the multiple second time differences are all smaller than a preset second time and the second time differences are substantially the same, it indicates that the headphone is stably maintained at a preset distance from the object, and it may be determined that the headphone is in the handheld status. In this manner, in response to that the second time differences are all smaller than the preset second time and differences between the second time differences are smaller than an error value, the microprocessor 140 determines that the headphone is in the handheld status.

The device for detecting a wearing status of a headphone according to embodiment four of the present disclosure embodies the process of detecting the status of the headphone through the acoustic detection assembly 130. The wearing status of the headphone is detected through the acoustic detection assembly 130 so that mis-determination can be reduced, and the power consumption of the headphone can be effectively reduced.

Based on the technical solutions of the preceding embodiments, embodiments of the present disclosure provide two example embodiments.

Figure 5:
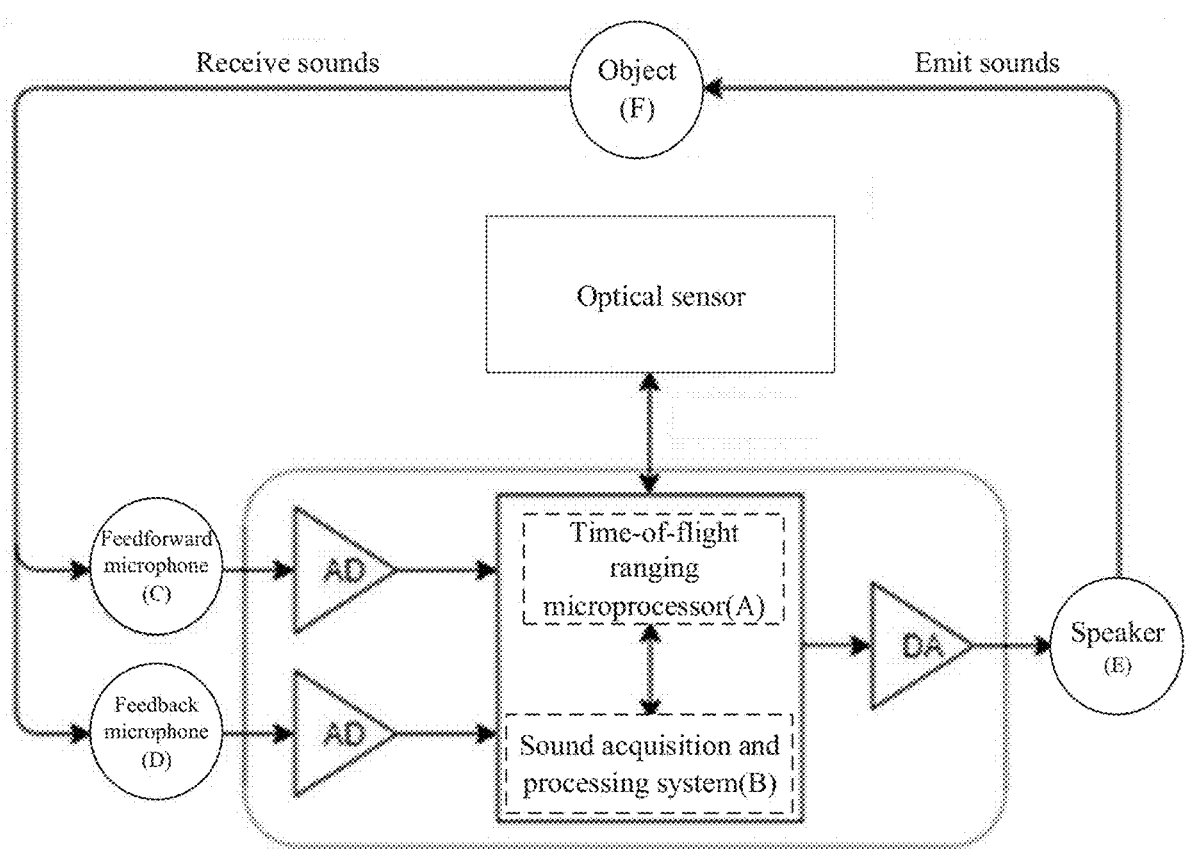
FIG. 5 is a structure diagram of a device for detecting a wearing status of a headphone according to an example embodiment of the present disclosure.

FIG. 5 is a structure diagram of a device for detecting a wearing status of a headphone according to an example embodiment of the present disclosure. As shown in FIG. 5, the device includes an optical sensor, a feedforward microphone, a feedback microphone, a time-of-flight ranging microprocessor, a sound acquisition and processing system and a speaker.

The optical sensor is configured to determine a wearing status of the headphone within a period of time after current time in the case where the headphone is in a worn status at the current time.

The time-of-flight ranging microprocessor and the sound acquisition and processing system are configured to determine, in combination with the feedforward microphone, the feedback microphone and the speaker, the wearing status of the headphone within the period of time after the current time in the case where the headphone is in a non-worn status at the current time.

For a detailed process, reference may be made to embodiments one to four, and the details are not repeated here.

Figure 6:
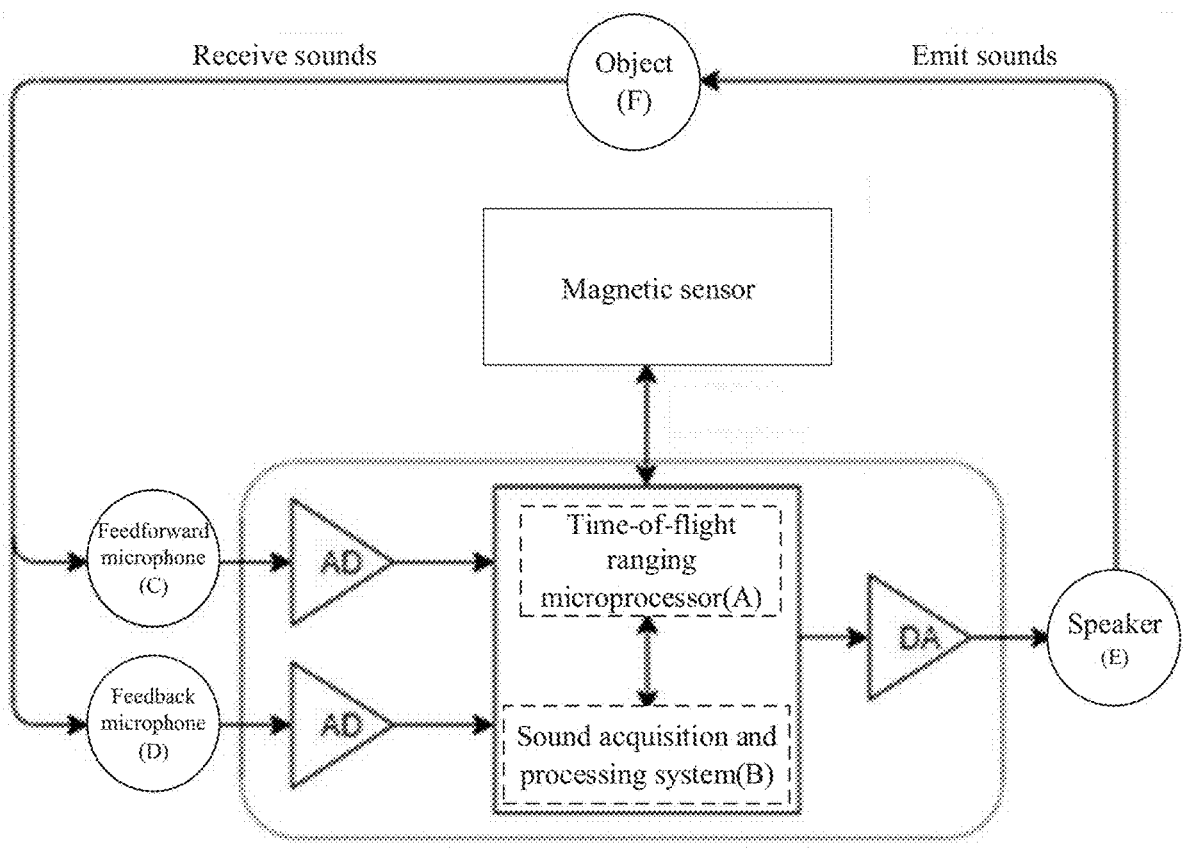
FIG. 6 is a structure diagram of another device for detecting a wearing status of a headphone according to an example embodiment of the present disclosure.

FIG. 6 is a structure diagram of another device for detecting a wearing status of a headphone according to an example embodiment of the present disclosure. As shown in FIG. 6, the device includes a magnetic sensor, a feedforward microphone, a feedback microphone, a time-of-flight ranging microprocessor, a sound acquisition and processing system and a speaker.

The magnetic sensor is configured to determine a wearing status of the headphone within a period of time after current time in the case where the headphone is in a worn status at the current time.

The time-of-flight ranging microprocessor and the sound acquisition and processing system are configured to determine, in combination with the feedforward microphone, the feedback microphone and the speaker, the wearing status of the headphone within the period of time after the current time in the case where the headphone is in a non-worn status at the current time.

For a detailed process, reference may be made to embodiment three, and the details are not repeated here.

Embodiment Five

Figure 7:
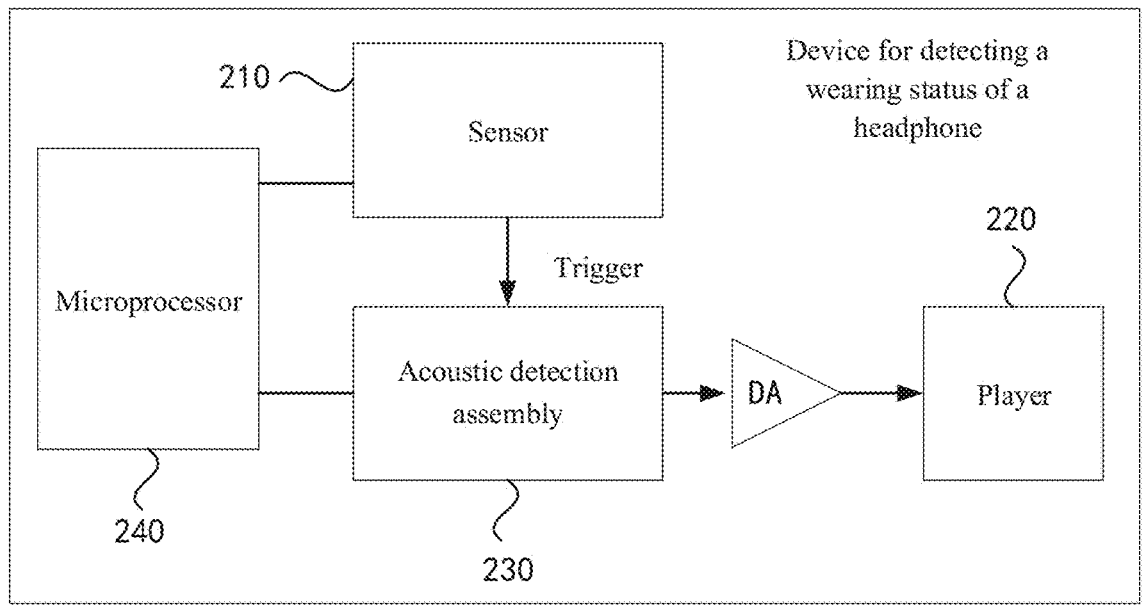
FIG. 7 is a structure diagram of a device for detecting a wearing status of a headphone according to embodiment five of the present disclosure.

FIG. 7 is a structure diagram of a device for detecting a wearing status of a headphone according to embodiment five of the present disclosure. The device for detecting a wearing status of a headphone is applicable to the detection of whether the headphone leaves a human ear when the headphone is worn on a user. The device for detecting a wearing status of a headphone may be implemented by software and hardware and may include an acoustic detection assembly to detect, through the acoustic detection assembly, whether the headphone is put into an ear.

As shown in FIG. 7, the device for detecting a wearing status of a headphone according to embodiment five of the present disclosure includes a sensor 210, a player 220, an acoustic detection assembly 230 and a microprocessor 240, where the acoustic detection assembly 230 is connected to the player 220 through a digital-to-analog converter, and the microprocessor 240 is connected to the sensor 210 and the acoustic detection assembly 230 respectively.

The sensor 210 is configured to send a trigger signal to the microprocessor 240 after sensing that the headphone leaves the ear.

The microprocessor 240 is configured to, after receiving the trigger signal, trigger the acoustic detection assembly 230 to detect the wearing status of the headphone.

The acoustic detection assembly 230 is configured to receive an audio signal by a receiver 250 in the acoustic detection assembly 230, convert the audio signal from a time domain signal to a frequency domain signal, and identify the frequency domain signal after conversion to determine the wearing status of the headphone, where the audio signal is played by the player 220.

In this embodiment, the sensor 210 may be different types of sensor. In some embodiments, the sensor 210 may include an optical sensor, a pressure sensor, a biosensor and a magnetic sensor.

In this embodiment, a manner in which the sensor 210 senses that the headphone leaves the ear is not limited. After sensing that the headphone leaves the ear, the sensor 210 may trigger, in various manners, the acoustic detection assembly 230 to detect the wearing status of the headphone. One feasible manner is to send the trigger signal to the acoustic detection assembly 230 to trigger the acoustic detection assembly 230 to detect the wearing status of the headphone.

Further, the receiver 250 may include a feedforward receiver and a feedback receiver.

In some embodiments, after the acoustic detection assembly 230 is triggered, the player 220 plays a segment of audio, which is then received by the receiver 250. After the headphone leaves the ear, audio signals received by the feedforward receiver and the feedback receiver gradually change. The feedforward receiver and the feedback receiver send the received audio signals to the acoustic detection assembly 230. The acoustic detection assembly 230 converts the audio signals from time domain signals to frequency domain signals and performs signal identification to determine the wearing status of the headphone.

The device for detecting a wearing status of a headphone according to embodiment five of the present disclosure can effectively detect the wearing status of the headphone through the acoustic detection assembly and the sensor.

Embodiment Six

FIG. 8 is a flowchart of a method for detecting a wearing status of a headphone according to embodiment six of the present disclosure. The method for detecting a wearing status of a headphone is applicable to the detection of whether the headphone is put into an ear. The method may be performed by the device for detecting a wearing status of a headphone according to embodiments one to four and specifically includes the steps below.

In S110, in the case where the headphone is in a worn status at current time, a wearing status of the headphone within a period of time after the current time is determined through a sensor.

In this embodiment, the sensor may be different types of sensor. In some embodiments, the sensor may include an optical sensor, a pressure sensor, a biosensor and a magnetic sensor. When it is detected that the headphone is worn on an ear of a user, that is, the headphone is in the worn status, the wearing status of the headphone in the later period may be detected through the sensor. It is to be noted that since the sensor cannot distinguish whether an object is a human ear or a metal object, the wearing status of the headphone may be detected by the sensor when it is determined that the headphone is in the worn status. In this case, the distance between the ear of the user and the headphone is detected so that mis-determination caused by the placement of the headphone on the metal object can be effectively avoided.

When the sensor is the optical sensor, the optical sensor may emit infrared light to the object and measure a time for the infrared light to be reflected back so that a microprocessor may calculate the distance between the ear of the user and the headphone according to the time and determines the wearing status of the headphone. In some embodiments, if the distance between the ear of the user and the headphone is greater than a preset value, it may be determined that the headphone leaves the ear and the headphone is not in the worn status; and if the distance between the ear of the user and the headphone is less than or equal to the preset value, it may be determined that the headphone is still worn on the ear of the user and the headphone is in the worn status. The preset value may be set according to actual situations and is not specifically limited here.

When the sensor is the magnetic sensor, the magnetic sensor measures a magnetic field intensity of a magnet in a player when the magnet moves so that the microprocessor may calculate a relative motion status between the object and the headphone according to the magnetic field intensity and determines the wearing status of the headphone within the period of time after the current time according to the relative motion status. In some embodiments, if the magnetic field intensity of the magnet becomes smaller, it indicates that the headphone leaves the ear, and it may be determined that the headphone is not in the worn status; if the magnetic field intensity of the magnet becomes larger, it indicates that the headphone approaches the ear, and it may be determined that the headphone is in the worn status.

In S120, in the case where the headphone is in a non-worn status at the current time, the wearing status of the headphone within the period of time after the current time is determined through the player and an acoustic detection assembly.

In this embodiment, the acoustic detection assembly may be an assembly including software and hardware, and the acoustic detection assembly is disposed between the player and the microprocessor. When it is detected that the headphone is not worn on the ear of the user or the headphone has been in the non-worn status for a long time, the wearing status of the headphone in the later period may be detected by the acoustic detection assembly.

The acoustic detection assembly may include a receiver and a sound processing software system. In combination with the player and the microprocessor, the acoustic detection assembly may detect the distance between the headphone and the object according to the acoustic principle and determine the wearing status of the headphone. Additionally, the acoustic detection assembly may effectively determine whether the headphone is worn on a person.

In the method for detecting a wearing status of a headphone according to embodiment six of the present disclosure, in the case where the headphone is in the worn status at the current time, the wearing status of the headphone within the period of time after the current time is determined through the sensor; in the case where the headphone is in the non-worn status at the current time, the wearing status of the headphone within the period of time after the current time is determined through the player and the acoustic detection assembly. The method can effectively detect the wearing status of the headphone through the acoustic detection assembly and an optical detection assembly.

Embodiment Seven

FIG. 9 is a flowchart of a method for detecting a wearing status of a headphone according to embodiment seven of the present disclosure. The method for detecting a wearing status of a headphone is applicable to the detection of whether the headphone leaves a human ear when the headphone is worn on a user. The method may be performed by the device for detecting a wearing status of a headphone according to embodiment five and includes the steps below.

In S210, a sensor triggers an acoustic detection assembly after sensing that the headphone leaves an ear.

In this embodiment, the sensor may be different types of sensors. In some embodiments, the sensor may include an optical sensor, a pressure sensor, a biosensor and a magnetic sensor. A manner in which the sensor senses that the headphone leaves the ear is not limited. After sensing that the headphone leaves the ear, the sensor may trigger, in various manners, the acoustic detection assembly to detect the wearing status of the headphone. One feasible manner is to send a trigger signal to the acoustic detection assembly to trigger the acoustic detection assembly to detect the wearing status of the headphone.

In S220, the acoustic detection assembly receives an audio signal by a receiver in the acoustic detection assembly, where the audio signal is played by a player.

The receiver may include a feedforward receiver and a feedback receiver.

In S230, the acoustic detection assembly converts the audio signal from a time domain signal to a frequency domain signal and identifies the frequency domain signal after conversion to determine the wearing status of the headphone.

In some embodiments, after the acoustic detection assembly is triggered, the player plays a segment of audio, which is then received by the receiver. After the headphone leaves the ear, audio signals received by the feedforward receiver and the feedback receiver gradually change. The feedforward receiver and the feedback receiver send the received audio signals to the acoustic detection assembly. The acoustic detection assembly converts the audio signals from time domain signals to frequency domain signals and performs signal identification to determine the wearing status of the headphone.

In the method for detecting a wearing status of a headphone according to embodiment seven of the present disclosure, the sensor triggers the acoustic detection assembly after sensing that the headphone leaves the ear; the acoustic detection assembly receives the audio signal received by the receiver and played by the player, where the acoustic detection assembly includes the receiver; and the acoustic detection assembly converts the audio signal from the time domain signal to the frequency domain signal and identifies the frequency domain signal after conversion to determine the wearing status of the headphone. The method can effectively detect the wearing status of the headphone.

Embodiment Eight

Figure 10:
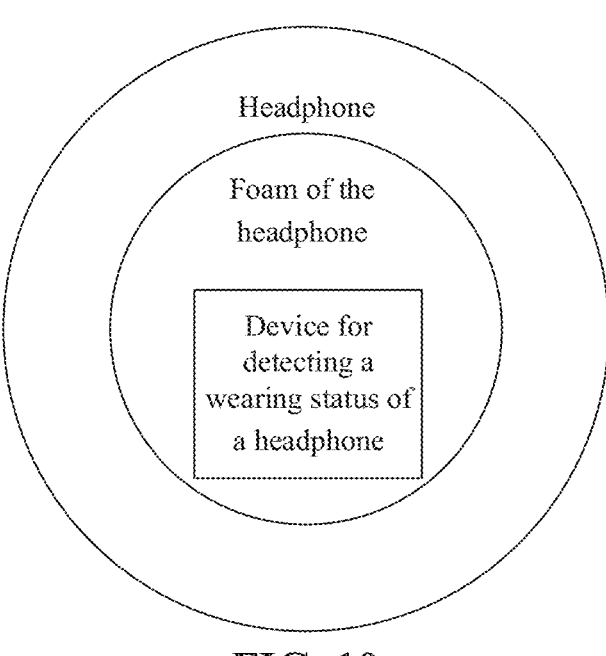
FIG. 10 is a structure diagram of a headphone according to embodiment eight of the present disclosure.

FIG. 10 is a structure diagram of a headphone according to embodiment eight of the present disclosure. As shown in FIG. 10, the headphone includes the device for detecting a wearing status of a headphone according to any embodiment of the present disclosure, where the foam of an ear cup of the headphone matches a sensor in shape. When the sensor is an optical sensor, the foam of the ear cup is configured with a concave surface so that the optical sensor conveniently emits and receives light. When the sensor is a magnetic sensor, the foam of the ear cup is configured with a plane surface and a speaker of the headphone is rotatable so that the magnetic sensor conveniently senses changes of a magnetic field.

Figure 11:
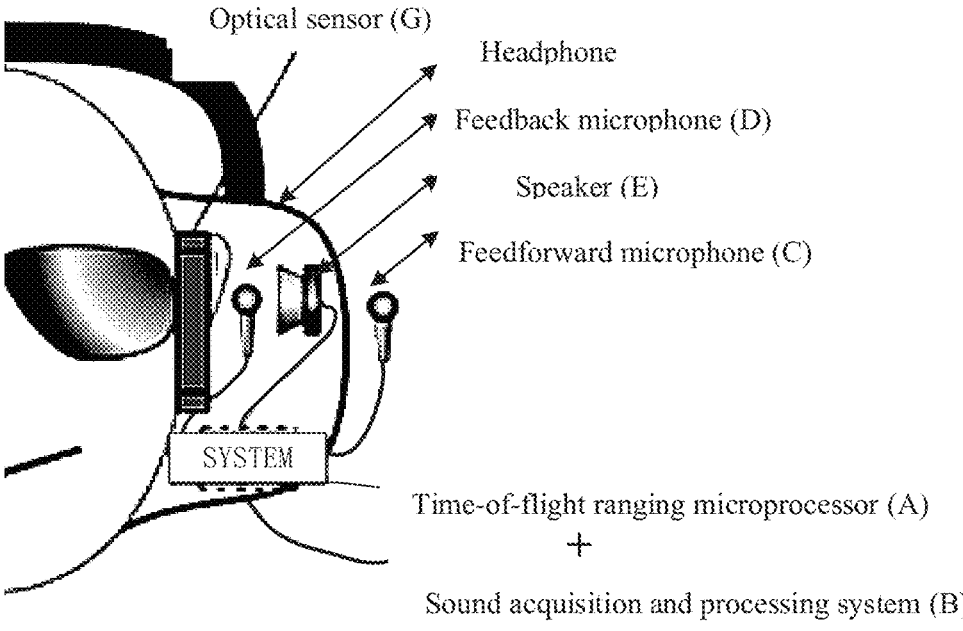
FIG. 11 is a diagram of the specific structure of a headphone according to embodiment eight of the present disclosure.

FIG. 11 is a diagram of the specific structure of a headphone according to embodiment eight of the present disclosure. As shown in FIG. 11, the internal structure of the device for detecting a wearing status of a headphone is embodied.

Figure 12:
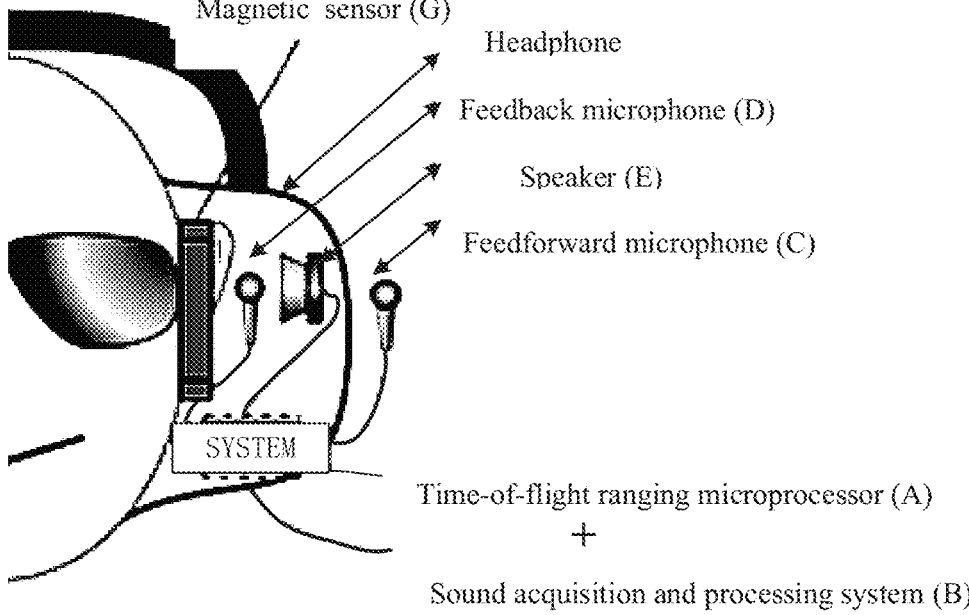
FIG. 12 is a diagram of the specific structure of another headphone according to embodiment eight of the present disclosure.

FIG. 12 is a diagram of the specific structure of another headphone according to embodiment eight of the present disclosure. As shown in FIG. 12, the internal structure of the device for detecting a wearing status of a headphone is embodied.

The headphone according to embodiment eight of the present disclosure may perform the method for detecting a wearing status of a headphone according to any embodiment of the present disclosure and has function modules and beneficial effects corresponding to the performed method.

It is to be understood that various forms of the preceding flows may be used, with steps reordered, added or removed. For example, the steps described in the present disclosure may be executed in parallel, in sequence or in a different order as long as the desired results of the technical solutions of the present disclosure can be achieved. The execution sequence of these steps is not limited herein.

The preceding embodiments are not intended to limit the scope of the present disclosure. It is to be understood by those skilled in the art that various modifications, combinations, subcombinations and substitutions may be made according to design requirements and other factors.

What is claimed is:

1. A device for detecting a wearing status of a headphone, comprising: a sensor, a player, an acoustic detection assembly and a microprocessor, wherein the acoustic detection assembly is connected to the player through a digital-to-analog converter, and the microprocessor is connected to the sensor and the acoustic detection assembly separately;

the sensor is configured to determine, in combination with the microprocessor, a wearing status of the headphone within a period of time after current time in a case where the headphone is in a worn status at the current time; and the acoustic detection assembly is configured to determine, in combination with the microprocessor and the player, the wearing status of the headphone within the period of time after the current time in a case where the headphone is in a non-worn status at the current time, wherein the sensor is a magnetic sensor configured to, when a magnet in the player moves, measure a magnetic field intensity of the magnet and send the magnetic field intensity to the microprocessor, and wherein the microprocessor is configured to calculate a relative motion status between an object and the headphone according to the magnetic field intensity, and determine the wearing status of the headphone within the period of time after the current time according to the relative motion status.

2. A device for detecting a wearing status of a headphone, comprising: a sensor, a player, an acoustic detection assembly and a microprocessor, wherein the acoustic detection assembly is connected to the player through a digital-to-analog converter, and the microprocessor is connected to the sensor and the acoustic detection assembly separately;

the sensor is configured to determine, in combination with the microprocessor, a wearing status of the headphone within a period of time after current time in a case where the headphone is in a worn status at the current time; and the acoustic detection assembly is configured to determine, in combination with the microprocessor and the player, the wearing status of the headphone within the period of time after the current time in a case where the headphone is in a non-worn status at the current time, wherein the sensor is an optical sensor comprising a proximity sensor and an infrared emitter; wherein the infrared emitter is configured to emit infrared light;

the proximity sensor is configured to receive reflected infrared light generated when the infrared light is reflected by an object and send a time when the reflected infrared light is received to the microprocessor; and the microprocessor is configured to calculate a distance between the object and the headphone according to the time, and determine the wearing status of the headphone within the period of time after the current time according to the distance.

3. The device of claim 1, wherein the acoustic detection assembly comprises a receiver, the acoustic detection assembly is configured to send a test audio to the player;

the player is configured to play an audio to an outside;

the receiver is configured to receive a reflected audio returned when the audio is reflected by an object, and send the reflected audio to the microprocessor;

the microprocessor is configured to determine whether the headphone is worn on a person according to an amplitude change of the reflected audio.

4. The device of claim 1, wherein the acoustic detection assembly comprises a sound processing software system and a receiver;

the microprocessor is configured to edit different audio signals into time codes and send the time codes to the sound processing software system;

the sound processing software system is configured to send the time codes to the player through the digital-to-analog converter, the player is configured to play the different audio signals, and the receiver is configured to receive reflected audio signals of the played different audio signals reflected by an object;

the sound processing software system is further configured to receive the reflected audio signals sent by the receiver through an analog-to-digital converter, perform frequency sampling on the reflected audio signals, acquire time codes corresponding to the reflected audio signals, and send both sending time points and receiving time points of acquired time codes to the microprocessor; and the microprocessor is further configured to calculate time differences according to the sending time points and the receiving time points and determine the wearing status of the headphone according to the time differences.

5. The device of claim 4, wherein audio signals comprise first audio signals, and the receiver comprises a feedback receiver, wherein the microprocessor is configured to: determine, according to a plurality of first time points at which the first audio signals reflected for a first time are received by the feedback receiver and a plurality of second time points at which the first audio signals are played by the player, a plurality of first time differences of the first audio signals, and determine the wearing status of the headphone according to changes of the plurality of first time differences.

6. The device of claim 4, wherein audio signals comprise second audio signals, and the receiver comprises a feedforward receiver, wherein the microprocessor is configured to: determine, according to a plurality of third time points at which the second audio signals reflected for a first time are received by the feedforward receiver and a plurality of fourth time points at which the second audio signals are played by the player, a plurality of second time differences of the second audio signals, and determine, according to whether the plurality of second time differences are all smaller than a preset time, whether the headphone is in a handheld status.

7. A device for detecting a wearing status of a headphone, comprising: a sensor, a player, an acoustic detection assembly and a microprocessor, wherein the acoustic detection assembly is connected to the player through a digital-to-analog converter, and the microprocessor is connected to the sensor and the acoustic detection assembly separately;

the sensor is configured to send a trigger signal to the microprocessor after sensing that the headphone leaves an ear;

the microprocessor is configured to trigger the acoustic detection assembly to detect the wearing status of the headphone after receiving the trigger signal; and the acoustic detection assembly is configured to, receive an audio signal by a receiver in the acoustic detection assembly, convert the audio signal from a time domain signal to a frequency domain signal, and identify the frequency domain signal after conversion to determine the wearing status of the headphone, wherein the audio signal is played by the player.

8. A method for detecting a wearing status of a headphone, performed by the device for detecting the wearing status of the headphone of claim 1, comprising:

in a case where the headphone is in a worn status at current time, determining a wearing status of the headphone within a period of time after the current time through the sensor; and in a case where the headphone is in a non-worn status at current time, determining a wearing status of the headphone within a period of time after the current time through the player and the acoustic detection assembly, wherein determining a wearing status of the headphone within a period of time after the current time through the sensor comprises:

when the magnet in the player moves, measuring, through the sensor, a magnetic field intensity of the magnet and sending, through the sensor, the magnetic field intensity to the microprocessor, and wherein the method further comprises:

calculating, through the microprocessor, the relative motion status between the object and the headphone according to the magnetic field intensity, and determining, through the microprocessor, the wearing status of the headphone within the period of time after the current time according to the relative motion status.

9. A method for detecting a wearing status of a headphone, performed by the device for detecting the wearing status of the headphone of claim 7, comprising:

triggering the acoustic detection assembly after the sensor senses that the headphone leaves an ear;

receiving, by the receiver of the acoustic detection assembly, an audio signal played by the player; and converting, by the acoustic detection assembly, the audio signal from a time domain signal to a frequency domain signal, and identifying the frequency domain signal after conversion to determine the wearing status of the headphone.

10. A method for detecting a wearing status of a headphone, performed by the device for detecting the wearing status of the headphone of claim 2, comprising:

in a case where the headphone is in a worn status at current time, determining a wearing status of the headphone within a period of time after the current time through the sensor; and in a case where the headphone is in a non-worn status at current time, determining a wearing status of the headphone within a period of time after the current time through the player and the acoustic detection assembly, wherein determining a wearing status of the headphone within a period of time after the current time through the sensor comprises:

emitting, through the infrared emitter, infrared light;

receiving, through the proximity sensor, reflected infrared light generated when the infrared light is reflected by an object and sending, by the proximity sensor, a time when the reflected infrared light is received to the microprocessor, and wherein the method further comprises:

calculating, through the microprocessor, a distance between the object and the headphone according to the time, and determining, through the microprocessor, the wearing status of the headphone within the period of time after the current time according to the distance.

11. The method of claim 8, wherein the acoustic detection assembly comprises a receiver, the method further comprising:

sending, through the acoustic detection assembly, a test audio to the player;

playing, through the player, an audio to an outside;

receiving, through the receiver, a reflected audio returned when the audio is reflected by an object, and sending, by the receiver, the reflected audio to the microprocessor; and determining, through the microprocessor, whether the headphone is worn on a person according to an amplitude change of the reflected audio.

12. The method of claim 8, wherein the acoustic detection assembly comprises a sound processing software system and a receiver; the method further comprising:

editing, through the microprocessor, different audio signals into time codes and sending, by the microprocessor, the time codes to the sound processing software system;

sending, through the sound processing software system, the time codes to the player through the digital-to-analog converter;

playing, through the player, the different audio signals;

receiving, through the receiver, reflected audio signals of the played different audio signals reflected by an object;

receiving, through the sound processing software system, the reflected audio signals sent by the receiver through an analog-to-digital converter, performing frequency sampling on the reflected audio signals, acquiring time codes corresponding to the reflected audio signals, and sending both sending time points and receiving time points of acquired time codes to the microprocessor; and calculating, through the microprocessor, time differences according to the sending time points and the receiving time points, and determining, through the microprocessor, the wearing status of the headphone according to the time differences.

13. The method of claim 12, wherein audio signals comprise first audio signals, and the receiver comprises a feedback receiver, the method further comprising:

determining, through the microprocessor, according to a plurality of first time points at which the first audio signals reflected for a first time are received by the feedback receiver and a plurality of second time points at which the first audio signals are played by the player, a plurality of first time differences of the first audio signals; and determining, through the microprocessor, the wearing status of the headphone according to changes of the plurality of first time differences.

14. The method of claim 12, wherein audio signals comprise second audio signals, and the receiver comprises a feedforward receiver, the method further comprising:

determining, through the microprocessor, according to a plurality of third time points at which the second audio signals reflected for a first time are received by the feedforward receiver and a plurality of fourth time points at which the second audio signals are played by the player, a plurality of second time differences of the second audio signals; and determining, through the microprocessor, according to whether the plurality of second time differences are all smaller than a preset time, whether the headphone is in a handheld status.

15. The method of claim 11, wherein the acoustic detection assembly comprises a sound processing software system; the method further comprising:

editing, through the microprocessor, different audio signals into time codes and sending, by the microprocessor, the time codes to the sound processing software system;

sending, through the sound processing software system, the time codes to the player through the digital-to-analog converter;

playing, through the player, the different audio signals;

receiving, through the receiver, reflected audio signals of the played different audio signals reflected by an object;

receiving, through the sound processing software system, the reflected audio signals sent by the receiver through an analog-to-digital converter, performing frequency sampling on the reflected audio signals, acquiring time codes corresponding to the reflected audio signals, and sending both sending time points and receiving time points of acquired time codes to the microprocessor; and calculating, through the microprocessor, time differences according to the sending time points and the receiving time points, and determining, by the microprocessor, the wearing status of the headphone according to the time differences.

16. The device of claim 2, wherein the acoustic detection assembly comprises a receiver, the acoustic detection assembly is configured to send a test audio to the player;

the player is configured to play an audio to an outside;

the receiver is configured to receive a reflected audio returned when the audio is reflected by an object, and send the reflected audio to the microprocessor;

the microprocessor is configured to determine whether the headphone is worn on a person according to an amplitude change of the reflected audio.

17. The device of claim 2, wherein the acoustic detection assembly comprises a sound processing software system and a receiver;

the microprocessor is configured to edit different audio signals into time codes and send the time codes to the sound processing software system;

the sound processing software system is configured to send the time codes to the player through the digital-to-analog converter, the player is configured to play the different audio signals, and the receiver is configured to receive reflected audio signals of the played different audio signals reflected by an object;

the sound processing software system is further configured to receive the reflected audio signals sent by the receiver through an analog-to-digital converter, perform frequency sampling on the reflected audio signals, acquire time codes corresponding to the reflected audio signals, and send both sending time points and receiving time points of acquired time codes to the microprocessor; and the microprocessor is further configured to calculate time differences according to the sending time points and the receiving time points and determine the wearing status of the headphone according to the time differences.

\* \* \* \* \*